MAGNETICALLY CONTROLLED SUPERCURRENT SWITCH

Filed May 7, 1971

INVENTORS R.C. DYNES
T. A. FULTON
BY Michael J. Urbano
ATTORNEY

United States Patent Office 3,706,064
Patented Dec. 12, 1972

3,706,064

MAGNETICALLY CONTROLLED SUPERCURRENT SWITCH

Robert Carr Dynes and Theodore Alan Fulton, Berkeley Heights, N.J., assignors to Bell Telephone Laboratories, Incorporated, Murray Hill, N.J.

Filed May 7, 1971, Ser. No. 141,142
Int. Cl. H01c 7/16
U.S. Cl. 338—32 S 12 Claims

ABSTRACT OF THE DISCLOSURE

In a conventional magnetically controlled supercurrent device the relationship between the critical supercurrent and the applied magnetic field resembles the absolute value of a Fraunhofer diffraction pattern having an absolute maximum at zero magnetic field and decreasing secondary maxima at periodic intervals of non-zero magnetic field. In order to reduce the magnitude of the secondary maxima, the direction of the applied magnetic field and the geometry of the weak-link interfacial region are mutually adapted so that the critical supercurrent density distribution normal to the direction of the field has a central maximum and gradually decreasing values on either side thereof.

BACKGROUND OF THE INVENTION

This invention relates to weak-link supercurrent devices and more particularly to magnetically controlled weak-link supercurrent switches.

In a paper entitled "Possible New Effect in Superconductive Tunneling," published in the July 1, 1962 issue of Physics Letters, pp. 251–252, B. D. Josephson predicted theoretically that a supercurrent would flow between two superconductors separated by a thin insulating barrier (i.e., an SIS supercurrent tunnel junction) by a mechanism known as two-particle superconducting tunneling. This effect has been observed and reported by P. W. Anderson and J. M. Rowell in a paper entitled "Probable Observation of the Josephson Superconducting Tunneling Effect" and published in the Mar. 15, 1963 issue of Physical Review Letters, pp. 230–232.

Other geometries exhibit the supercurrent phenomenon but are not limited to two-particle tunneling. P. W. Anderson and A. H. Dayem described in Physical Review, 13, 195 (1964) a superconducting bridge which has effects nearly identical to those observed in the planar SIS Josephson structure. In U.S. Pat. 3,423,607 issued on Jan. 21, 1969, and assigned to applicants' assignee, J. E. Kunzler et al. teach the existence of supercurrents in point contact structures and in U.S. Pat. 3,573,661 issued on Apr. 6, 1971, and assigned to applicants' assignee, D. E. McCumber teaches that a normal metal may be substituted for the insulator in SIS structures thereby forming what is termed an SNS structure. Each of these structures, among others, is briefly described in an article entitled "The Making of Josephson Junctions" by D. N. Langenberg et al. in Electronics, 44, 42 (Mar. 1, 1971).

In general, a supercurrent device comprises an interfacial region between a pair of superconductive regions. As pointed out in the previous examples, the interfacial region may be formed in a variety of geometries including SIS, SNS, point contact, and bridge type structures. The interfacial region in each of the above cases is a weak-link region interconnecting the superconductive regions, the weak-link breaking down when a critical supercurrent is exceeded. The weak-link is the thin insulator in the SIS structure, the thin normal metal in the SNS structure, the region of contact in the point contact contract structure and the region of minimum cross-sectional area in the bridge structure.

Each of these structures exhibits effects analogous to, but not limited to, the Josephson two-particle tunneling effect: when the current through the structure is increased from zero, the voltage across the interface remains zero over a range of current below a first critical supercurrent designated $I_c$. When the current flow through the interface exceeds $I_c$, the voltage across the interface abruptly increases to some finite value. Furthermore, when the current is reduced from above to below $I_c$, the voltage across the interface may remain finite until a second critical supercurrent, termed the switchback current, is reached whereupon the interface voltage again drops to zero.

As described in U.S. Pat. 3,281,609 issued to J. M. Rowell on Oct. 25, 1966, and assigned to applicants' assignee, in each of the aforementioned weak-link supercurrent devices the critical supercurrent is sensitive to an applied magnetic field. When the magnetic field is applied parallel to one of the superconductors (as in FIG. 4 of the patent) the distribution of $I_c$ vs. B (i.e., $I_c(B)$) typically resembles the absolute value of a Fraunhofer diffraction pattern (FIG. 3 of the patent) having an absolute maximum at $B=O$ and decreasing secondary maxima at periodic intervals of non-zero magnetic field. When utilized as a magnetically controlled switch, such a device is typically current-biased and the applied magnetic field is varied to cause the critical supercurrent to vary above and below the bias current, thereby switching the device from a zero voltage to a finite voltage state. As will be more fully described hereinafter, to produce well-defined states for such a switch, it is desirable to reduce, and ideally to eliminate, the secondary maxima of the $I_c(B)$ pattern.

SUMMARY OF THE INVENTION

In accordance with an illustrative embodiment of our invention the secondary maxima in the $I_c(B)$ pattern of a weak-link supercurrent device are reduced by mutually adapting the direction of the applied magnetic field and the geometry of the weak-link interfacial region so that the critical supercurrent density distribution normal to the direction of the applied field has a central maximum and gradually decreasing values on either side thereof. In a preferred embodiment the shape of one of the superconductors is made to be Gaussian and the magnetic field is applied in a direction normal thereto.

BRIEF DESCRIPTION OF THE DRAWINGS

The invention, together with its various features and advantages, can be easily understood from the following more detailed description taken in conjunction with the accompanying drawings in which.

DETAILED DESCRIPTION

Figure 1A:
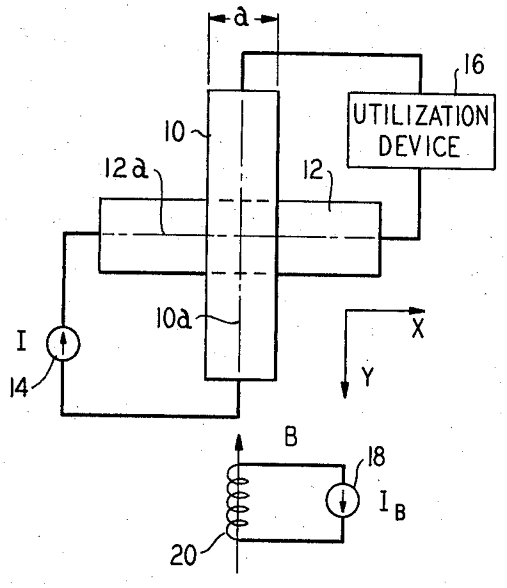
FIG. 1A (PRIOR ART)
FIG. 1A is a schematic of a prior art magnetically controlled supercurrent switch.
Figure 1B:
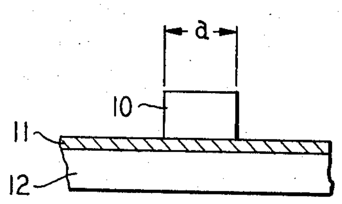
FIG. 1B (PRIOR ART)
FIG. 1B is a partial end view of the device of FIG. 1A.

Before discussing our invention in detail it will be helpful to consider first the prior art magnetically controlled supercurrent switch. As shown in FIGS. 1A and 1B the prior art switch, illustratively an SIS Josephson junction, comprises a pair of crossed supercondutive thin films 10 and 12 having an insulative layer 11 formed therebetween by oxidation, evaporation or other well known fabrication technique. Typically the films have their longitudinal axes 10*a* and 12*a* oriented normal to one another. The switch is current biased by current source 14 connected across one end of the films 10 and 12, and the output, taken across the other end, is connected to a utilization device 16, typically a voltmeter or a well known weak-link magnetometer.

Figure 1C:
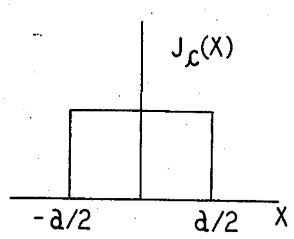
FIG. 1C (PRIOR ART)
FIG. 1C is a graph of the critical supercurrent density distribution normal to the direction of the applied field for the device of FIG. 1A.

As shown in FIG. 1C the critical supercurrent density distribution in the junction in the $x$-direction is uniform across the width $a$ of superconductive film 10.

When a magnetic field B, generated by current from source 18 flowing in coil 20, is coupled into the junction parallel to film 10 (normal to the $x$-direction) a certain prescribed level of critical supercurrent $I_c$ is established depending on the magnitude of the field. As that magnitude is varied, however, the function $I_c(B)$ follows a Fraunhofer diffraction pattern (in absolute value) as shown in FIG. 1D; i.e., $I_c(B)$ has an absolute maximum at $B=0$ and periodic decreasing secondary maxima spaced at integral multiples of the flux quantum $h/2e=2.07\times10^{-15}$ Webers divided by the cross-sectional area in the junction which is penetrated by the magnetic field B.

Figure 1D:
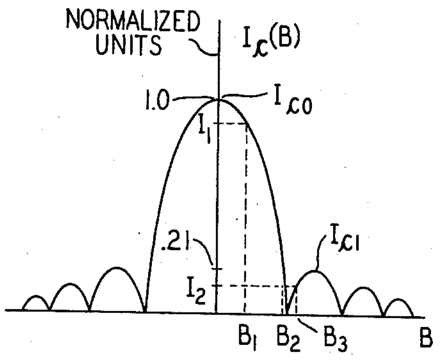
FIG. 1D (PRIOR ART)
FIG. 1D is a graph of critical supercurrent versus applied magnetic field of the device of FIG. 1A.

In operation the switch of FIG. 1A is typically biased at a current level $I_1$ as shown in FIG. 1D. When the field generated by coil 20 is less than $B_1$, then $I_c>I_1$ and the switch is in a zero voltage state. When, however, B is increased above $B_1$, then $I_c<I_1$ and the switch is in a finite voltage state in which the voltage across the junction is equal to the sum of the superconducting gap voltages of the superconductors 10 and 12.

For several reasons, however, it is desirable to reduce the level of the bias current. First, higher bias currents result in unnecessary power consumption. Secondly, since the critical supercurrent $I_c$ is highly sensitive to stray magnetic fields and transients, spurious switching may result if $I_1$ is too close to $I_{c0}$, the maximum critical current at $B=0$. Although it is desirable to reduce the bias current, another problem arises when the bias current (e.g., $I_2$) is reduced below the level $I_{c1}$ of the first (largest) secondary maximum. A magnetic field B such that $B_2<B<B_3$ causes the device of FIG. 1A to switch to a finite voltage state. Because $B_2$ and $B_3$ are very near to each other (e.g., field values corresponding to fractions of a flux quantum apart) the magnitude of B to cause the device to switch to a finite voltage state is critical. Note that both $B<B_2$ and $B>B_3$ are states in which $I_c>I_2$ and hence are zero voltage states.

We propose, however, to reduce the secondary maxima of the $I_c(B)$ pattern, thereby reducing, and for all practical purposes eliminating, the aforementioned criticality of the applied magnetic field for desirably low bias currents. In accordance with an illustrative embodiment of our invention, this object is achieved by mutually adapting the direction of the applied magnetic field and the geometry of the weak-link interfacial region so that the critical supercurrent density distribution in a direction normal to the applied field has a central maximum and gradually decreasing values on either side thereof. Note, however, that the term "gradually decreasing" values is not limited necessarily to monotonically decreasing values although the latter is preferred from a simplicity of fabrication standpoint. Where the field is applied in the $y$-direction in the $(x, y)$ plane of the junction, then the critical supercurrent density distribution referred to herein is given by $$J_c(x)=\int J_c(x, y)dy \text{ (width of the junction)}$$

The shape of the interfacial region may be controlled directly, for example, by the selective deposition of an oxide or normal metal layer as by utilizing well-known photolithographic tenchniques. Alternatively, a uniform oxide or normal metal may be utilized and the fabrication of at least one of the superconductors may be controlled to produce the desired shape.

Figure 2A:
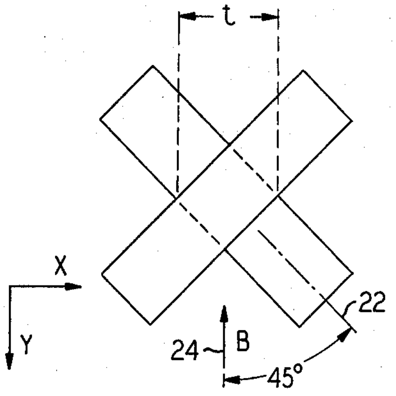
FIG. 2A is a schematic of an illustrative embodiment of our invention.
Figure 2B:
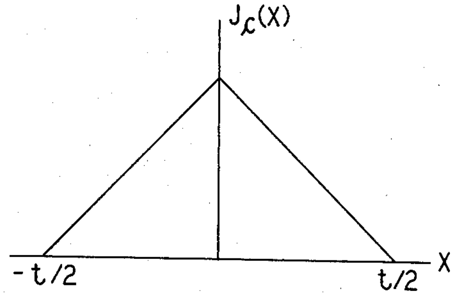
FIGS. 2B and 2C are respectively graphs of $J_c(x)$ and $I_c(B)$ for the embodiment of FIG. 2A.
Figure 2C:
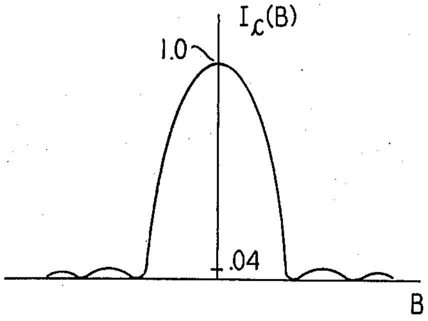

In the simplest embodiment, the structure of FIG. 1A is preferably oriented at about 45 degrees to the direction of the applied magnetic field as shown in FIG. 2A. That is, the longitudinal axis 22 of either of the elongated superconductors makes an angle of about 45 degrees with the direction 24 of the applied field B. The resultant critical supercurrent density distribution normal to the direction of B is triangular in shape as shown in FIG. 2B. In the resultant $I_c(B)$ pattern, shown in FIG. 2C, the largest secondary maximum (the first side lobe) is reduced to a level of about 0.04 of the absolute maximum at $B=0$, an improvement by more than a factor of 5 over the prior art switch of FIG. 1A.

Figure 3A:
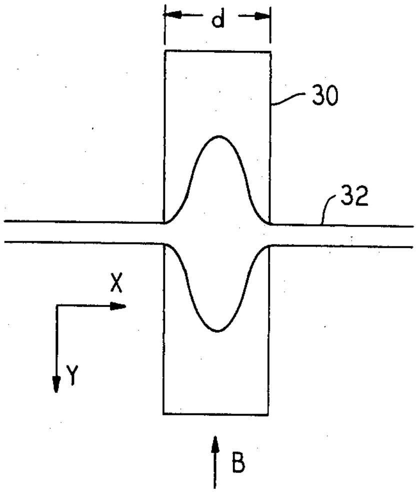
FIG. 3A is a schematic of a second illustrative embodiment of our invention.
Figure 3B:
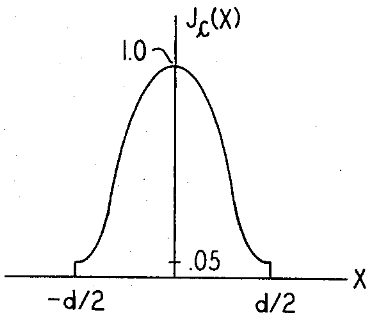
FIGS. 3B and 3C are respectively graphs of $J_c(x)$ and $I_c(B)$ for the embodiment of FIG. 3A.
Figure 3C:
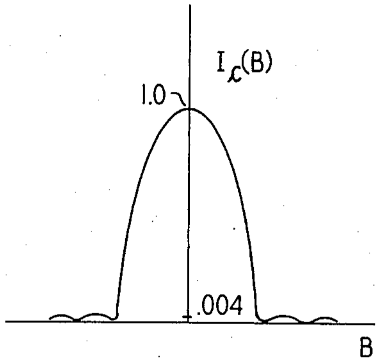

Ideally, to eliminate the side lobes entirely, the distribution of the critical supercurrent density should be Gaussian. However, a Gaussian distribution has nonzero tails which extend to infinity. As practical matter, therefore, the tails of the Gaussian shape must be truncated. Thus, in the embodiment of FIG. 3A, one of the superconductors is an elongated rectangular thin film 30 having illustratively an oxide layer (not shown) formed thereon, but the other superconductor 32 has a truncated Gaussian shape in the region of overlap with film 30. Note that while the superconductor 32 is shown to be symmetrical about the $x$-axis, an asymmetrical shape, in which the superconductor 32 is Gaussian either above or below the $x$-axis, would produce the same results. That is, if the Gaussian critical supercurrent density distribution of FIG. 3B is truncated at 10 percent of the maximum at $x=0$, then in the $I_c(B)$ pattern of FIG. 3C, the largest secondary maximum is reduced to a level of about 0.018 of the absolute maximum at $B=0$. Of course, if the supercurrent distribution of FIG. 3B is truncated at even lower levels (e.g., 0.05) then the largest secondary maximum is correspondingly reduced (e.g., to 0.004). The latter two examples represent, respectively, reductions in the largest secondary maximum by factors of about 11 and 52.

EXAMPLE

In accordance with the embodiment of our invention shown in FIG. 2A, we have constructed an SIS junction by first evaporating a tin film on a glass substrate, then oxidizing the film to form a tin oxide insulator and subsequently evaporating a second tin film perpendicular to the first using well known masking techniques. Each of the tin films was about 1500 A. thick and 0.25 mm. wide whereas the oxide layer was about 10 A. thick. The structure was placed in a cryostat magnetically shielded with Mumetal and the temperature was lowered to about 1.4° K.

A current of about 1.75 ma. (peak) at 1.0 kHz. was applied across the superconductive tin films and a magnetic field, applied parallel to the junction and at about 45° to the tin films, was swept slowly at a rate of about 4 gauss/min. The voltage across the superconductors was monitored in order to detect transitions between zero voltage and finite voltage and the $I_c(B)$ curve was plotted on an $x$–$y$ recorder. Under these conditions, we measured the largest secondary maximum to be about 2.2% of the maximum at $B=0$ as contrasted with the theoretically predicated level of about 4%. These two values are considered to be in good agreement. The discrepancy probably arises from a number of factors including (1) trapped magnetic flux in the junction causing the field to be nonuniform, (2) thermal fluctuations in $I_c$ at low current levels and (3) the fact that the junction region was not a perfect square.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, we have recognized that the critical supercurrent density distribution $J_c(x)$ is the Fourier transform of the $I_c(B)$ pattern, and conversely, when the field is applied in the $y$-direction. Consequently, the necessary shape of the interfacial region may be determined by taking the inverse Fourier transform of the desired $I_c(B)$ pattern.

What is claimed is:

1. A weak-link supercurrent device comprising:

a pair of superconductive regions having a weak-link interfacial region joining said superconductive regions, in response to a current applied across said superconductive regions and to a magnetic field applied thereto, said device normally having the property that its critical supercurrent versus magnetic field characteristic resembles the absolute value of a Fraunhofer diffraction pattern having an absolute maximum of critical supercurrent at zero magnetic field and a plurality of secondary critical supercurrent maxima at periodic nonzero values of magnetic field, said device being characterized by the improvement comprising means for reducing the level of said secondary critical supercurrent maxima in which the direction of the applied magnetic field and the shape of the weak-link interfacial region are mutually adapted so that the spatial distribution of the critical supercurrent density in said interfacial region transverse to the direction of the applied magnetic field has a central absolute maximum and gradually decreasing values of supercurrent on either side of said central maximum.

2. The device of claim 1 wherein said field and said interfacial region are mutually adapted so that said spatial distribution of critical supercurrent density is substantially triangular.

3. The device of claim 2 wherein each of said superconductive regions comprises an elongated thin film, said thin films are oriented substantially perpendicular to one another, said interfacial region is formed in the region of overlap between said thin films, and said magnetic field is applied in the plane of said interfacial region and at an angle of approximately 45° to the longitudinal axes of said superconductive thin films.

4. The device of claim 1 wherein said field and said interfacial region are mutually adapted so that said spatial distribution of critical supercurrent density is substantially Gaussian.

5. The device of claim 4 wherein one of said superconductive regions comprises a planar thin film, and the other of said superconductors comprises a thin film having a substantially Gaussian shape in a direction normal to that of the applied magnetic field.

6. The device of claim 5 wherein said other superconductor has a substantially Gaussian shape on only one side of an axis perpendicular to the direction of said applied field.

7. The device of claim 5 wherein said other superconductor has a substantially Gaussian shape on both sides of an axis perpendicular to the direction of said applied field.

8. A weak-link supercurrent device comprising a pair of superconductive regions having a weak-link interfacial region joining said superconductive regions, at least one of said superconductive regions having a shape characterized by a maximum dimension along a first axis parallel to said interfacial region and by gradually decreasing dimensions on either side of said first axis.

9. The device of claim 8 wherein said shape is substantially Gaussian on at least one side of a second axis parallel to said interfacial region and perpendicular to said first axis.

10. The device of claim 9 wherein said shape is symmetrically Gaussian on both sides of said second axis.

11. The device of claim 8 wherein said shape is substantially triangular on at least one side of a second axis parallel to said interfacial region and perpendicular to said first axis.

12. The device of claim 11 wherein said shape is symmetrically triangular on both sides of said second axis.

References Cited

UNITED STATES PATENTS 3,281,609 10/1966 Rowell ............ 307—245
3,370,210 2/1968 Fiske ............ 307—306 X
3,383,758 5/1968 Bremer ............ 338—32 S X CLARENCE L. ALBRITTON, Primary Examiner U.S. Cl. X.R.

174—Dig. 6; 307—245; 335—216